(12) United States Patent
McKenney

(10) Patent No.: US 10,372,510 B2
(45) Date of Patent: Aug. 6, 2019

(54) USING EXPEDITED GRACE PERIODS TO SHORT-CIRCUIT NORMAL GRACE-PERIOD COMPUTATIONS

(71) Applicant: International Business Machines Corporation, Armonk, NY (US)

(72) Inventor: Paul E. McKenney, Beaverton, OR (US)

( * ) Notice: Subject to any disclaimer, the term of this patent is extended or adjusted under 35 U.S.C. 154(b) by 269 days.

(21) Appl. No.: 15/459,728

(22) Filed: Mar. 15, 2017

(65) Prior Publication Data

US 2018/0267840 A1 Sep. 20, 2018

(51) Int. Cl.
*G06F 9/52* (2006.01)
*G06F 9/44* (2018.01)
*G06F 9/4401* (2018.01)

(52) U.S. Cl.
CPC ............ *G06F 9/526* (2013.01); *G06F 9/4418* (2013.01)

(58) Field of Classification Search
CPC ................................ G06F 9/4418; G06F 9/526
See application file for complete search history.

(56) References Cited

U.S. PATENT DOCUMENTS

| | | |
|---|---|---|
| 5,442,758 A | 8/1995 | Slingwine et al. |
| 5,608,893 A | 4/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,353,346 B2 | 4/2008 | McKenney et al. |
| 7,349,879 B2 | 6/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,454,581 B2 | 11/2008 | McKenney et al. |
| 7,472,228 B2 | 12/2008 | McKenney et al. |
| 7,653,791 B2 | 1/2010 | McKenney |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Fahmida Rahman
(74) *Attorney, Agent, or Firm* — Walter W. Duft

(57) ABSTRACT

A technique for short-circuiting normal read-copy update (RCU) grace period computations in the presence of expedited RCU grace periods. Both normal and expedited RCU grace period processing may be periodically performing to respectively report normal and expedited quiescent states on behalf of CPUs in a set of CPUs until all of the CPUs have respectively reported normal or expedited quiescent states so that the normal and expedited grace periods may be respectively ended. The expedited grace periods are of shorter duration than the normal grace periods. Responsive to a condition indicating that the normal RCU grace period processing can be short-circuited by the expedited RCU grace period processing, the expedited RCU grace period processing may report both expedited quiescent states and normal quiescent states on behalf of the same CPUs in the set of CPUs.

20 Claims, 11 Drawing Sheets

(56) References Cited

U.S. PATENT DOCUMENTS

| | | | |
|---|---|---|---|
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 9,189,413 B2 | 11/2015 | McKenney | |
| 9,250,978 B2 | 2/2016 | McKenney | |
| 9,256,476 B2 | 2/2016 | McKenney | |
| 9,348,765 B2 | 5/2016 | McKenney | |
| 9,396,226 B2 | 6/2016 | McKenney | |
| 9,389,925 B2 | 7/2016 | McKenney | |
| 2008/0082532 A1 | 4/2008 | McKenney | |
| 2013/0061071 A1 | 3/2013 | McKenney | |
| 2013/0152095 A1* | 6/2013 | McKenney | G06F 9/522 718/102 |
| 2014/0281295 A1* | 9/2014 | McKenney | G06F 12/121 711/159 |
| 2014/0380084 A1 | 12/2014 | McKenney | |
| 2015/0153817 A1* | 6/2015 | McKenney | G06F 9/5094 713/323 |
| 2018/0060140 A1* | 3/2018 | McKenney | G06F 9/526 |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[Patch] slab: document Slab_Destroy_by_Rcu", LKML. org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN. net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN. net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.Little", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
ip.com et al.; "Throttling RCU updates to conserve memory", IPCOM000224867D, Jan. 8, 2013, 4 pages.

(56) References Cited

OTHER PUBLICATIONS ip.com et al.; "Expedited RCU Grace Periods With Improved Energy Efficiency", IPCOM000242015D, Jun. 15, 2015, 2 pages.
P. McKenney, "[Patch RFC tip/core/rcu 0/5] Expedited grace periods encouraging normal ones", LKML.org, Jun. 30, 2015, 1 page.

* cited by examiner

USING EXPEDITED GRACE PERIODS TO SHORT-CIRCUIT NORMAL GRACE-PERIOD COMPUTATIONS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock( ) and rcu_read_unlock( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as current versions of the Linux® kernel, there are expedited and normal RCU grace periods. A normal RCU grace period may be initiated by way of a call to the synchronize_rcu( ) or synchronize_sched( ) primitives whereas a call to the synchronize_rcu_expedited( ) or synchronize_sched_expedited( ) primitives initiates an expedited RCU grace period. Expedited RCU grace periods can be orders of magnitude faster than normal RCU grace periods and are thus useful for latency-sensitive operations.

Expedited and normal RCU grace periods have historically run completely separately from each other in the Linux® kernel. However, if an expedited RCU grace period executes after a normal RCU grace period starts, the normal RCU grace period could end as soon as the expedited RCU grace period ends insofar as the latter guarantees that all CPUs of interest will have passed through a quiescent state. Given previous implementations, the normal RCU grace period will instead continue executing, needlessly consuming CPU time and needlessly increasing grace-period latency.

It would therefore be beneficial if a normal RCU grace period could take advantage of the work done by an expedited RCU grace period.

SUMMARY

A method, system and computer program product are provided for short-circuiting normal read-copy update (RCU) grace period computations in the presence of expedited RCU grace periods. In an example embodiment, both normal and expedited RCU grace period processing may be periodically performed to respectively report normal and expedited quiescent states on behalf of CPUs in a set of CPUs until all of the CPUs have respectively reported normal or expedited quiescent states so that the normal and expedited grace periods may be respectively ended. The expedited grace periods are of shorter duration than the normal grace periods. Responsive to a condition indicating that the normal RCU grace period processing can be short-circuited by the expedited RCU grace period processing, the expedited RCU grace period processing may report both expedited quiescent states and normal quiescent states on behalf of the same CPUs in the set of CPUs.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
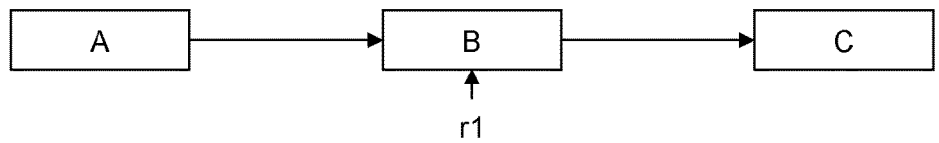
FIGS. 1A-1D are diagrammatic representations of a linked list of data elements undergoing a data element replacement according to a conventional read-copy update mechanism.
Figure 1B:
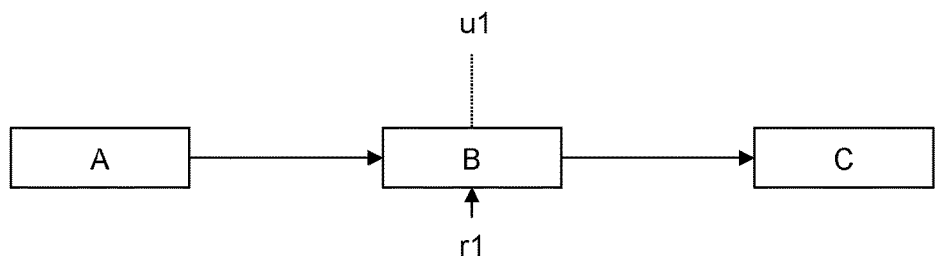
Figure 1C:
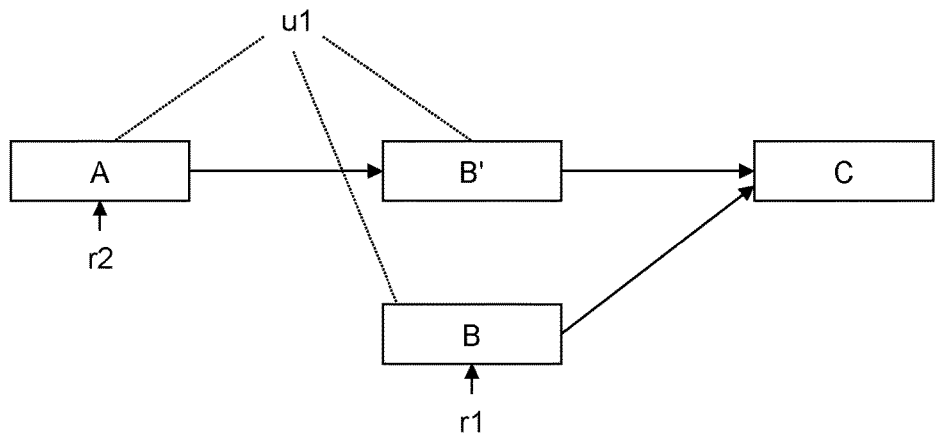
Figure 1D:
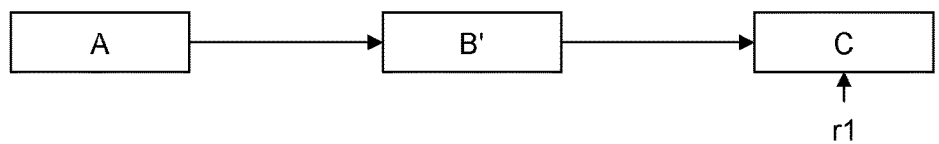
Figure 2A:
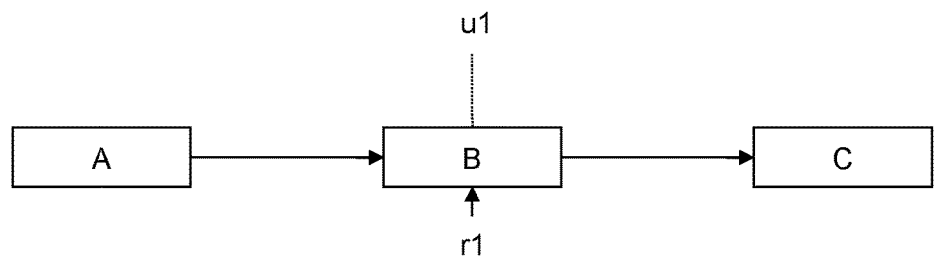
FIGS. 2A-2C are diagrammatic representations of a linked list of data elements undergoing a data element deletion according to a conventional read-copy update mechanism.
Figure 2B:
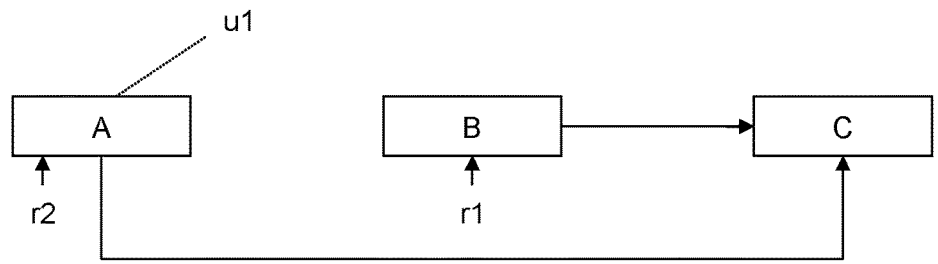
Figure 2C:
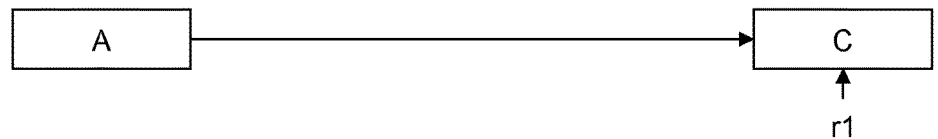
Figure 3:
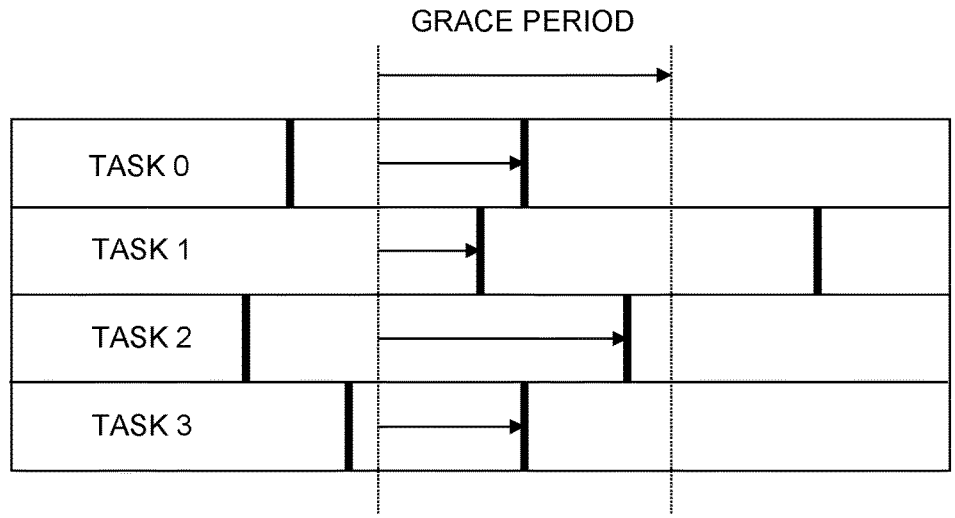
FIG. 3 is a flow diagram illustrating an example prior art grace period in which four processes pass through a quiescent state.
Figure 4:
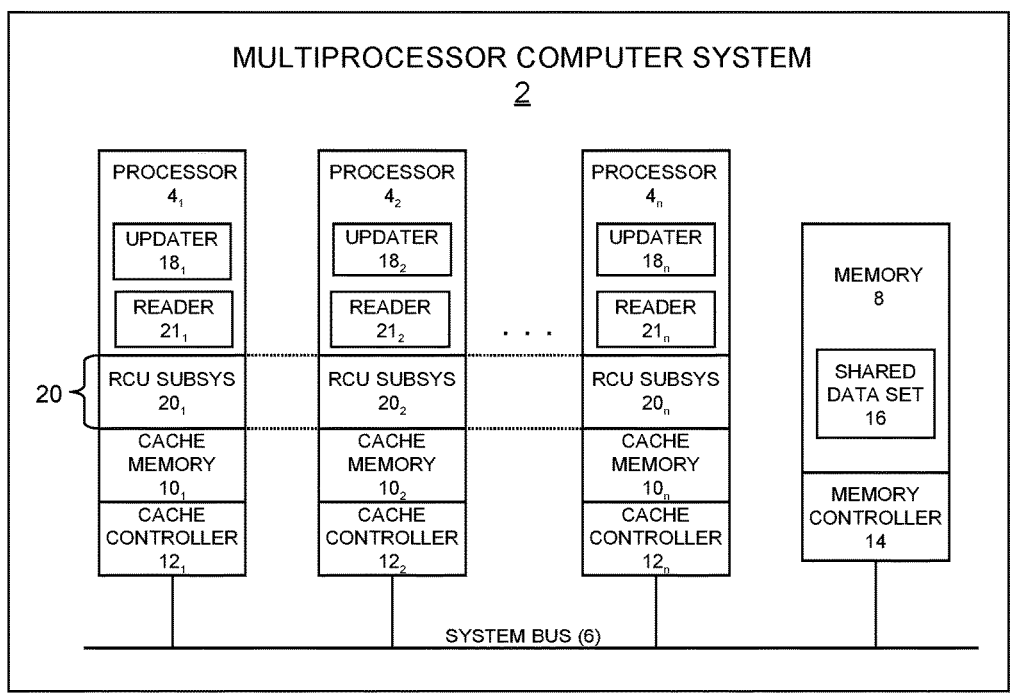
FIG. 4 is a functional block diagram showing a multiprocessor computing system.

Turning now to the figures, wherein like reference numerals represent like elements in all of the several views, FIG. 4 illustrates an example multiprocessor computer system in which a technique for using expedited RCU grace periods to short-circuit normal RCU grace period computations may be implemented. In FIG. 4, a computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2 \ldots 10_n$ may be implemented in several levels (e.g., as level 1, level 2 and level 3 caches) and the cache controllers $12_1$, $12_2 \ldots 12_n$ may collectively represent the cache controller logic that supports each cache level.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run periodically to perform updates on a set of shared data 16 that may be stored in the shared memory 8 (or elsewhere). In FIG. 4, reference numerals $18_1$, $18_2 \ldots 18_n$ illustrate individual data updaters that respectively execute on the several processors $4_1$, $4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1$, $20_2 \ldots 20_n$ represent individual RCU instances that may respectively periodically execute on the several processors $4_1$, $4_2 \ldots 4_n$. Operational details of the RCU subsystem 20 are described below.

Any given processor 4 may also periodically execute read operations (readers) 21. Each reader 21 may run from program instructions stored in the memory 8 (or elsewhere) in order to periodically perform read operations on the set of shared data 16 stored in the shared memory 8 (or elsewhere). In FIG. 4, reference numerals $21_1$, $21_2 \ldots 21_n$ illustrate individual reader instances that may respectively execute on the several processors $4_1$, $4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke the RCU subsystem 20 to track either a normal or expedited RCU grace period for deferred destruction of the pre-update view of the data (second-phase update).

Figure 5:
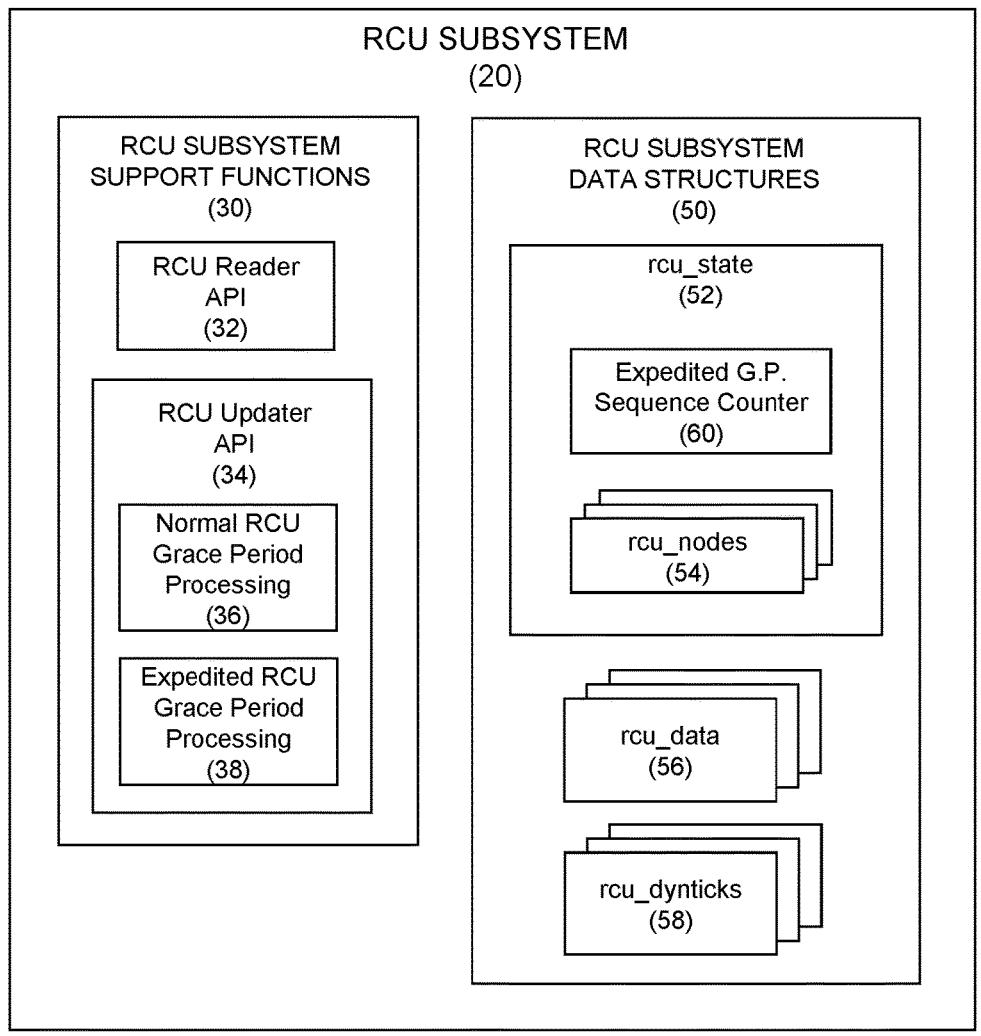
FIG. 5 is a functional block diagram showing an example RCU subsystem that may be provided in the computer system of FIG. 4.

Turning now to FIG. 5, example components of the RCU subsystem 20 are shown. Among these components is a set of RCU subsystem support functions 30, namely, an RCU reader API (Application Programming Interface) 32 and an RCU updater API 34.

The RCU reader API 32 may include a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may include a normal RCU grace period processing component 36 and an expedited RCU grace period processing component 38. The normal RCU grace period component 36 may include synchronization primitives such as synchronize_rcu( ) or synchronize_sched( ) for use by updaters 18 to defer the removal of shared data 16 that may be referenced by the readers 21 until a normal RCU grace period has elapsed. These functions, which may be implemented in the context of a kernel thread (e.g. a Linux® kthread), perform normal RCU grace period processing that includes starting new normal RCU grace periods and detecting the end of old normal RCU grace periods by waiting for CPUs in the computer system 2 to pass through quiescent states.

The expedited RCU grace period component 38 may include synchronization primitives such as synchronize_rcu_expedited( ) or synchronize_sched_expedited( ) for use by updaters 18 to defer the removal of shared data 16 that may be referenced by the readers 21 until an expedited RCU grace period has elapsed. These functions perform expedited RCU grace processing that includes starting new expedited RCU grace periods and detecting the end of old expedited RCU grace periods by actively initiating quiescent states on the CPUs in the computer system 2. In current versions of the Linux® kernel, this is done by sending an interprocessor interrupt (IPI) to all non-idle non-nohz (tickless) online CPUs. The IPI handler may check whether the CPU is in an RCU read-side critical section, and if so, may set a flag that defers the reporting of a expedited quiescent state until the outermost rcu_read_unlock operation (in a set of nested invocations of this read-side RCU primitive) has completed. On the other hand, if the CPU is not in an RCU read-side critical section, the IPI handler may report the quiescent state immediately. CPUs that are idle or offline may have expedited quiescent states noted on their behalf without using IPIs. In a typical RCU implementation, an expedited RCU grace period may be an order of magnitude faster than a normal RCU grace period.

Figure 6:
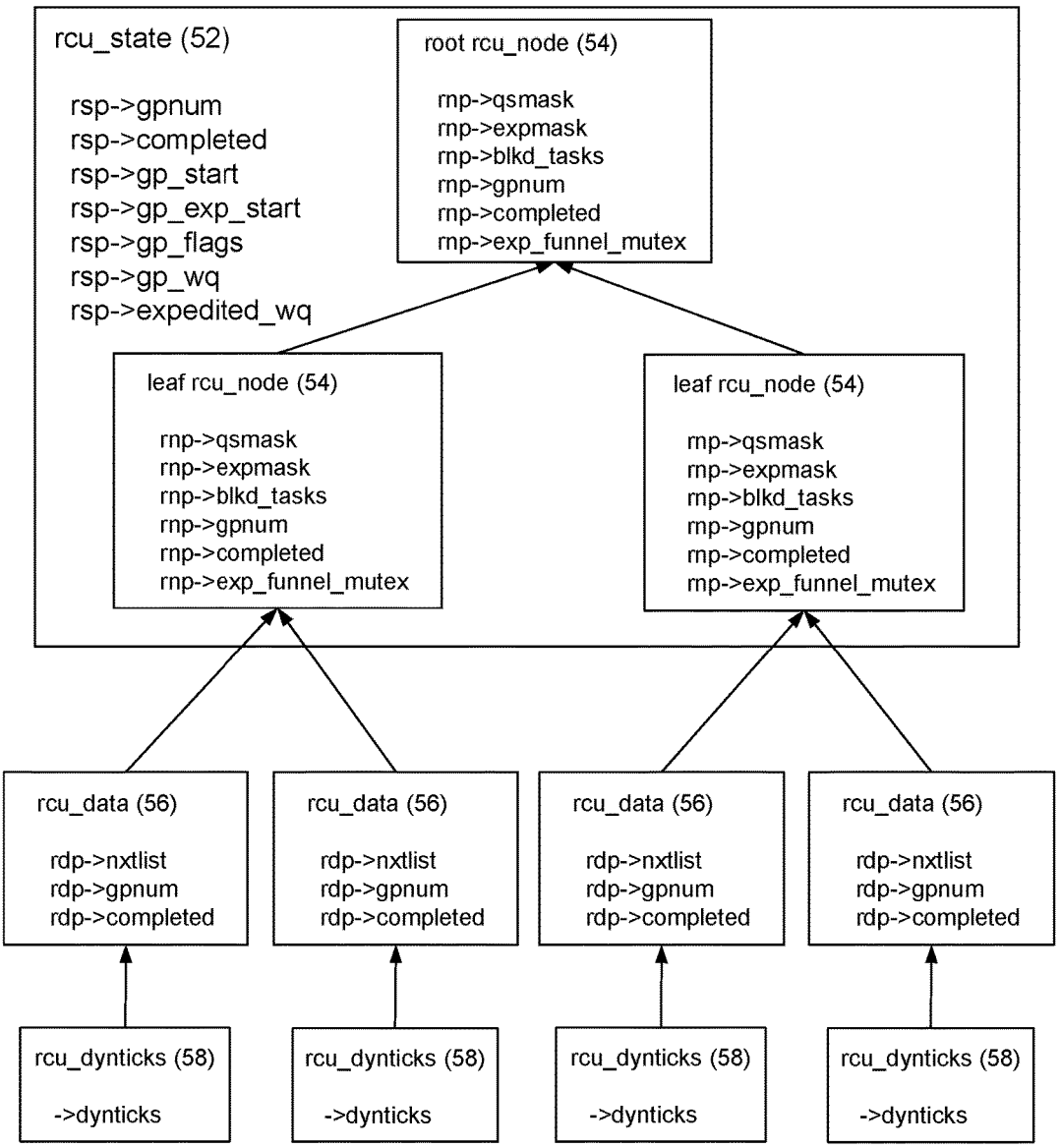
FIG. 6 is a functional block diagram showing an example data structures of the RCU subsystem of FIG. 5.

With continuing reference now to FIG. 5, the RCU subsystem 20 further includes a set of RCU subsystem data structures 50. These data structures may include one or more rcu_state structures 52 (one for each RCU flavor implemented by the computer system 2). Each rcu_state structure (named rsp in Linux® kernel RCU implementations) may have embedded therein (e.g., as a linear array) a combining tree of rcu_node structures 54 (named rnp in Linux® kernel RCU implementations). An example two-level tree of rcu_node structures 54 is shown in FIG. 6. In this embodiment, the combining tree of FIG. 6 may include one root rcu_node structure 54 and two leaf rcu_node structures 54. The RCU subsystem 20 thus supports hierarchical grace period detection, and may be characterized as a hierarchical RCU implementation.

The rcu_state structure 52 and the rcu_node structures 54 track information needed to determine when RCU grace periods have elapsed. For the rcu_state structure 52, such tracked information may include the current normal grace period number, the number of the most recent normal grace period to have completed, the start time of the current normal grace period, and the start time of the current expedited grace period. For RCU implementations in current versions of the Linux® kernel, the rcu_state structure field that tracks the current normal grace period number is named rsp→gpnum, the field that tracks that last completed normal grace period number is named rsp→completed, and the field that tracks the start time of the current normal grace period is named rsp→gp_start. These fields are shown in the rcu_state structure 52 of FIG. 6. An rcu_state structure field that tracks the start time of the current expedited grace period does not exist for RCU implementations in current versions of the Linux® kernel. It is a new field introduced by way of the present disclosure. In FIG. 6, this field is named rsp→gp_exp_start. An additional field that may be provided in the rcu_state structure 52 is a flags field named rsp→gp_flags. This field is used to influence operation of the normal RCU grace period kthreads. The rcu_state structure 52 may also maintain two wait queues for updaters 18 that are respectively awaiting the end of a normal RCU grace period and an expedited RCU grace period. For RCU implementations in current versions of the Linux® kernel, the normal RCU grace period wait queue is named rsp→gp_wq and the expedited RCU grace period is named rsp→expedited_wq.

The information tracked by the rcu_node structures 54 may include a bitmask identifying CPUs that have passed through a normal quiescent state, a bitmask identifying CPUs that have passed through an expedited quiescent state, a list of blocked readers 21 that have been preempted within an RCU read-side critical section, a current normal grace period number known to the rcu_node structure 54, and the last normal grace period known by the rcu_node structure to have been completed. For RCU implementations in current versions of the Linux® kernel, the rcu_node structure field that maintains the normal quiescent state bitmask is named rnp→qsmask, the rcu_node structure field that maintains the expedited quiescent state bitmask is named rnp→expmask, the rcu_node structure field that maintains the blocked tasks list is named rnp→blkd_tasks, the rcu_node structure field that maintains the current normal grace period number is named rnp→gpnum, and the rcu_node structure field that maintains the last completed normal grace period number is named rnp→completed. The rcu_node structures 54 may also provide a funnel mutex used for serializing expedited RCU grace period operations. For RCU implementations in current versions of the Linux® kernel, the rcu_node structure field that maintains the funnel mutex is named rnp→exp_funnel_mutex. The foregoing fields are shown in each rcu_node structure 54 of FIG. 6.

Each leaf rcu_node structure 54 additionally has a set of a per-processor rcu_data structures 56 assigned to it. Each rcu_data structure 56 represents one CPU in the computer system 2 and may be used to maintain RCU-related information specific to that CPU, such as an RCU callback list, a current normal grace period number, and a completed normal grace period number. For RCU implementations in current versions of the Linux® kernel, the rcu_data structure field that maintains the current normal grace period number is named rdp→gpnum, the rcu_data structure field that maintains the completed normal grace period number is named rdp→completed, and the rcu_data structure field that references the RCU callback list is named rdp→nxtlist. The foregoing fields are shown in each rcu_data structure 56 of FIG. 6.

The RCU subsystem data structures 50 shown in FIG. 5 may further include a set of per-CPU rcu_dynticks structures 58. Each of these structures maintains a counter that indicates whether or not a given CPU is in dynticks-idle mode. For RCU implementations in current versions of the Linux® kernel, the field that maintains this counter is named rcu_dynticks→dynticks. This field is shown in each rcu_dynticks structure of FIG. 6. The rcu_dynticks→dynticks counter counts the corresponding CPU's transitions to and from dyntick-idle mode, so that the counter has an even value when the CPU is in dyntick-idle mode and an odd value otherwise.

The RCU subsystem data structures 50 shown in FIG. 5 may further include an expedited RCU grace period sequence counter 60. The expedited RCU grace period sequence counter is used in conventional RCU implementations of the Linux® kernel to suppress redundant expedited RCU grace period processing when an expedited RCU grace period is already underway.

As discussed in the "Background" section above, expedited and normal RCU grace periods have historically run completely separately from each other in the Linux® kernel. However, if an expedited RCU grace period executes after a normal RCU grace period starts, the normal RCU grace period could end as soon as the expedited RCU grace period ends insofar as the latter guarantees that all CPUs of interest will have passed through a quiescent state. In such prior art RCU implementations, the normal RCU grace period will instead continue executing, needlessly consuming CPU time and needlessly increasing grace-period latency.

A solution to this problem is to have the expedited RCU grace period processing component 38 short-circuit normal RCU grace period processing computations (performed by the normal RCU grace period processing component 36) in the presence of expedited RCU grace periods. This may be done by configuring the expedited RCU grace period processing component 38 so that it reports a normal quiescent state at the same time it reports an expedited quiescent state on behalf of CPUs that need both. For such CPUs, the elapsing of an expedited RCU grace period will end the normal RCU grace period, so that the normal RCU grace period may also be deemed to have elapsed.

In prior art RCU implementations used in the Linux® kernel, expedited RCU grace period processing selects the CPUs that are offline or idle and reports an expedited quiescent state on their behalf. IPIs are issued to the remaining online, non-idle CPUs. For the CPUs receiving IPIs, a function named resched_cpu ( ) may be invoked that causes the kernel scheduler to perform a context switch. This will eventually cause both an expedited quiescent state and a normal quiescent state to be reported on behalf of such CPUs. For the offline or idle CPUs, the reporting of an expedited quiescent state does not normally result in the reporting of a normal quiescent state. However, the present disclosure provides a modified version of the expedited RCU grace period processing component 38 wherein both an expedited quiescent state and a normal quiescent state will be reported on behalf of such CPUs, thereby assisting the normal RCU grace period processing component 36. The modified version of the expedited RCU grace period processing component 38 also reports both expedited and quiescent states for CPUs with blocked readers following the completion of the outermost rcu_read_unlock operation on such CPUs.

Figure 7:
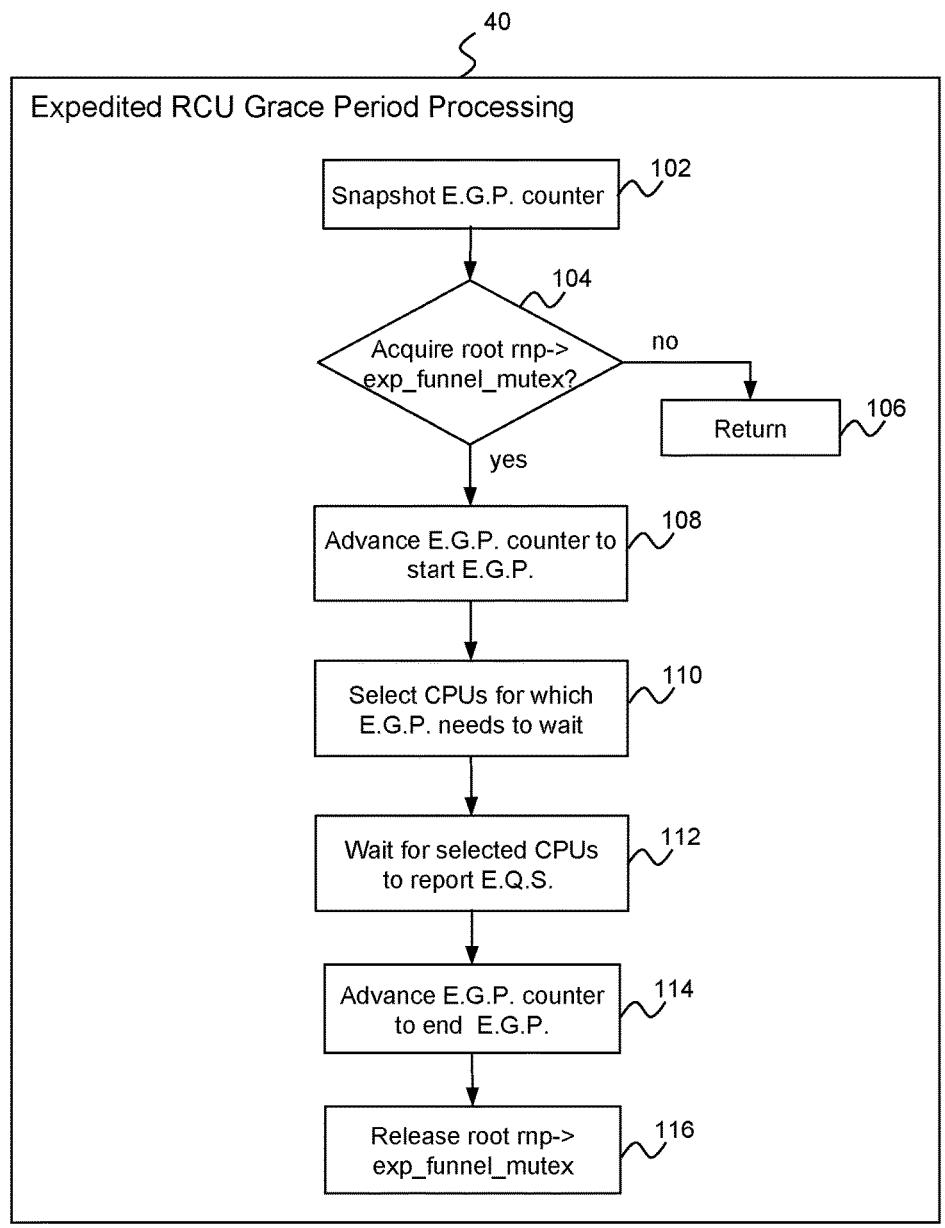
FIG. 7 is a flow diagram illustrating an example prior art function that may be used to implement expedited RCU grace processing operations.
Figure 8:
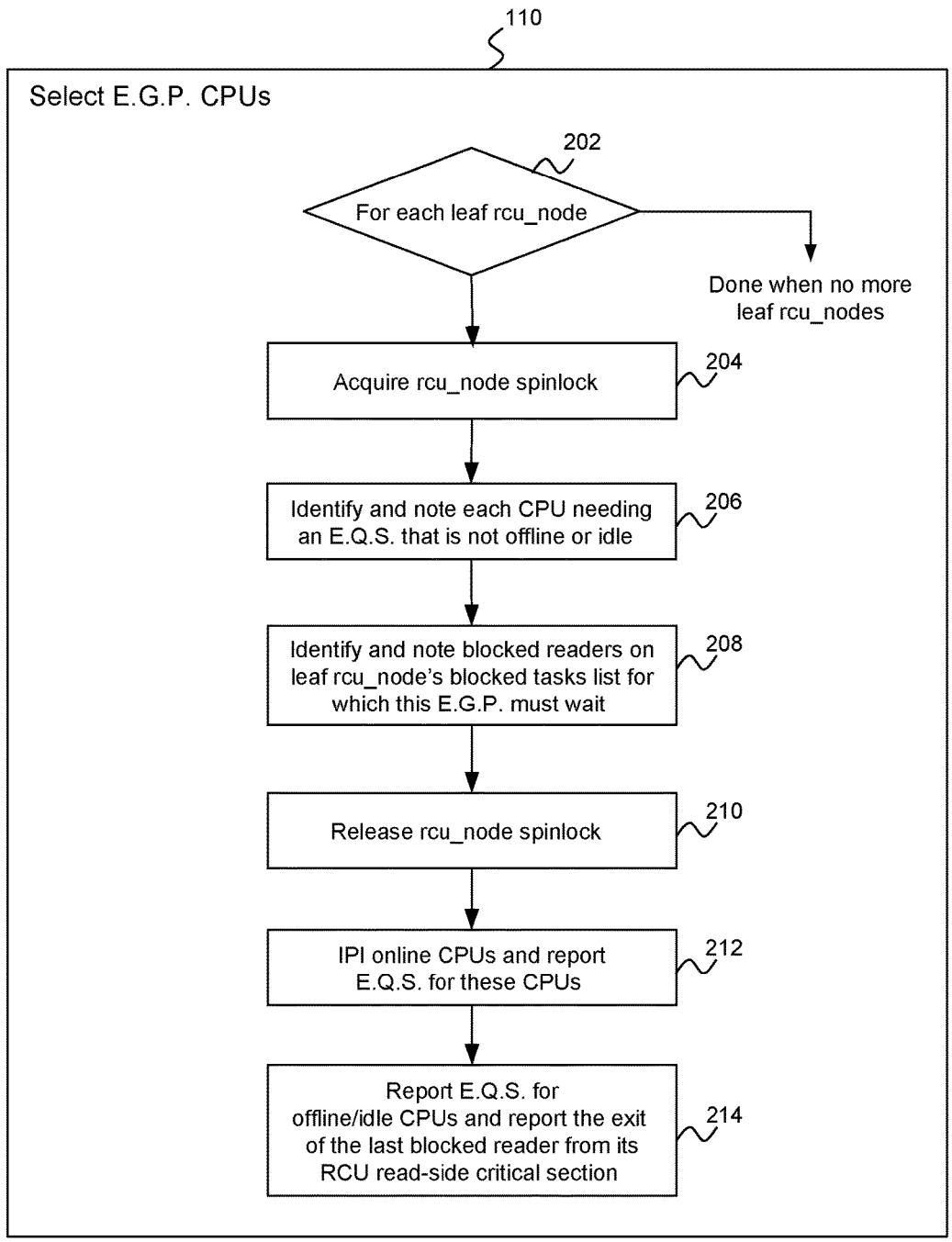
FIG. 8 is a flow diagram illustrating an example prior art function that may be called by the function of FIG. 7 as part of expedited RCU grace period processing operations.
Figure 9:
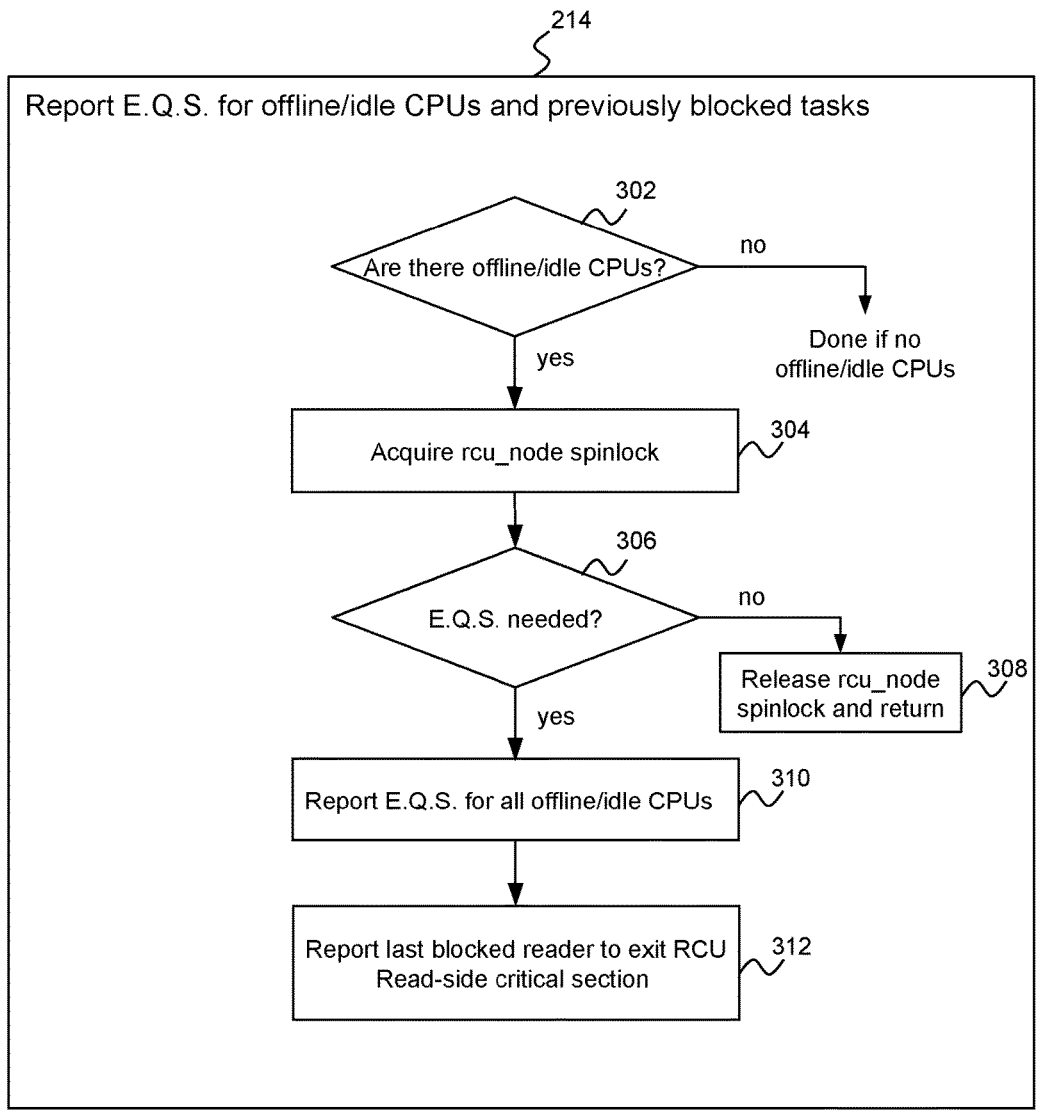
FIG. 9 is a flow diagram illustrating an example prior art function that may be called by the function of FIG. 8 as part of expedited RCU grace period processing operations.
Figure 10A:
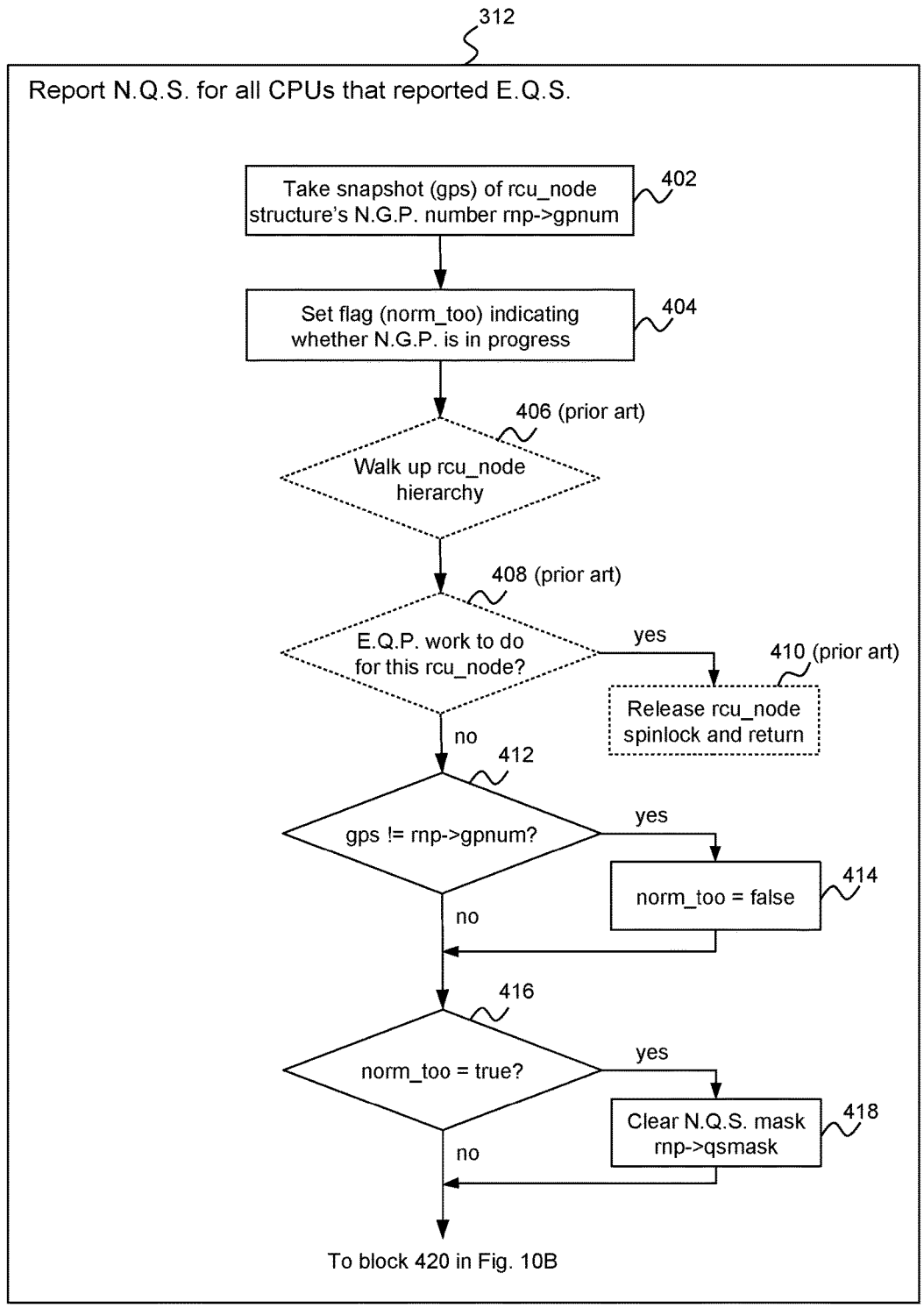
FIGS. 10A, 10B and 10C represent a single flow diagram illustrating a novel hybrid function that may be called by the function of FIG. 9 as part of expedited RCU grace period processing operations.
Figure 10B:
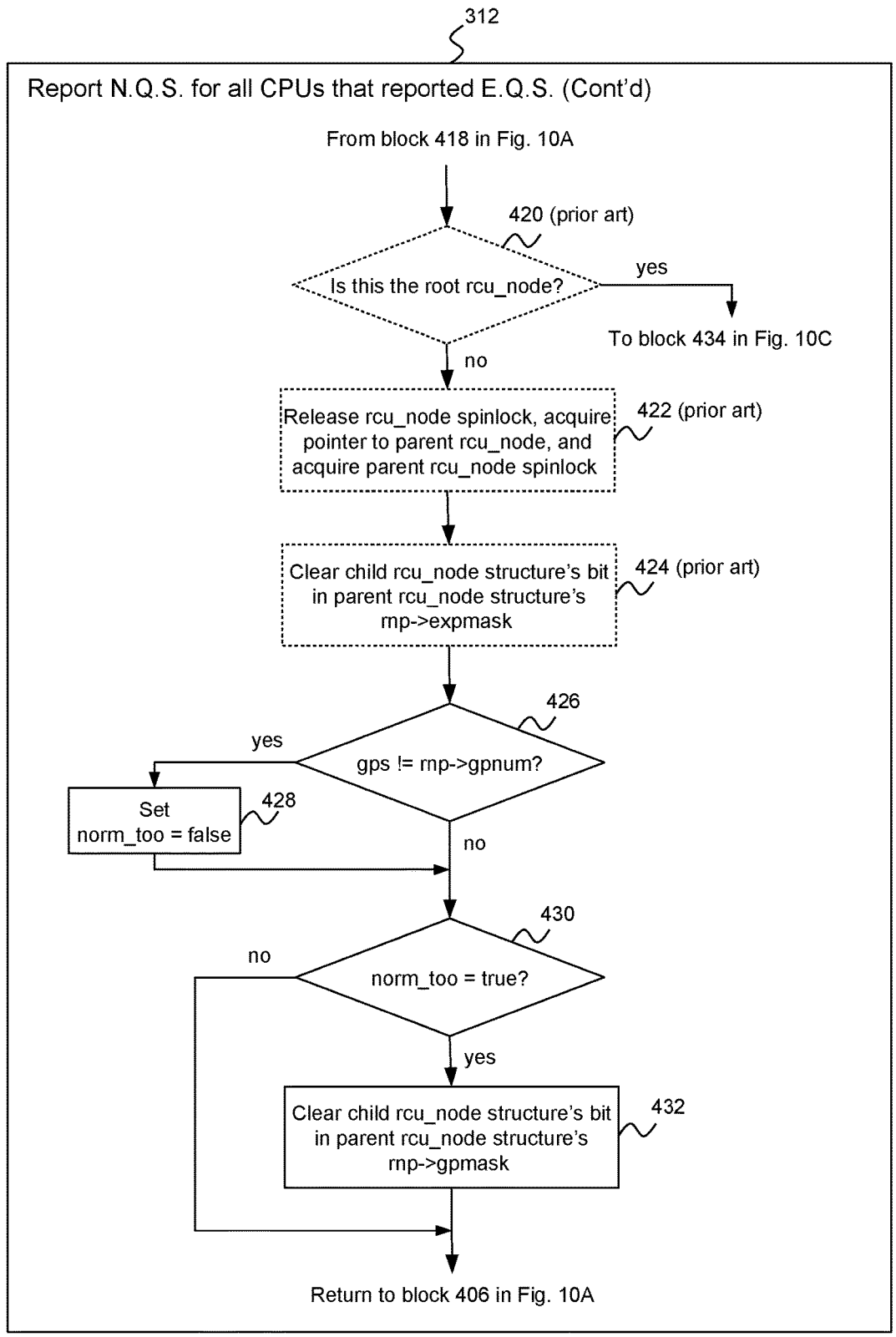
Figure 10C:
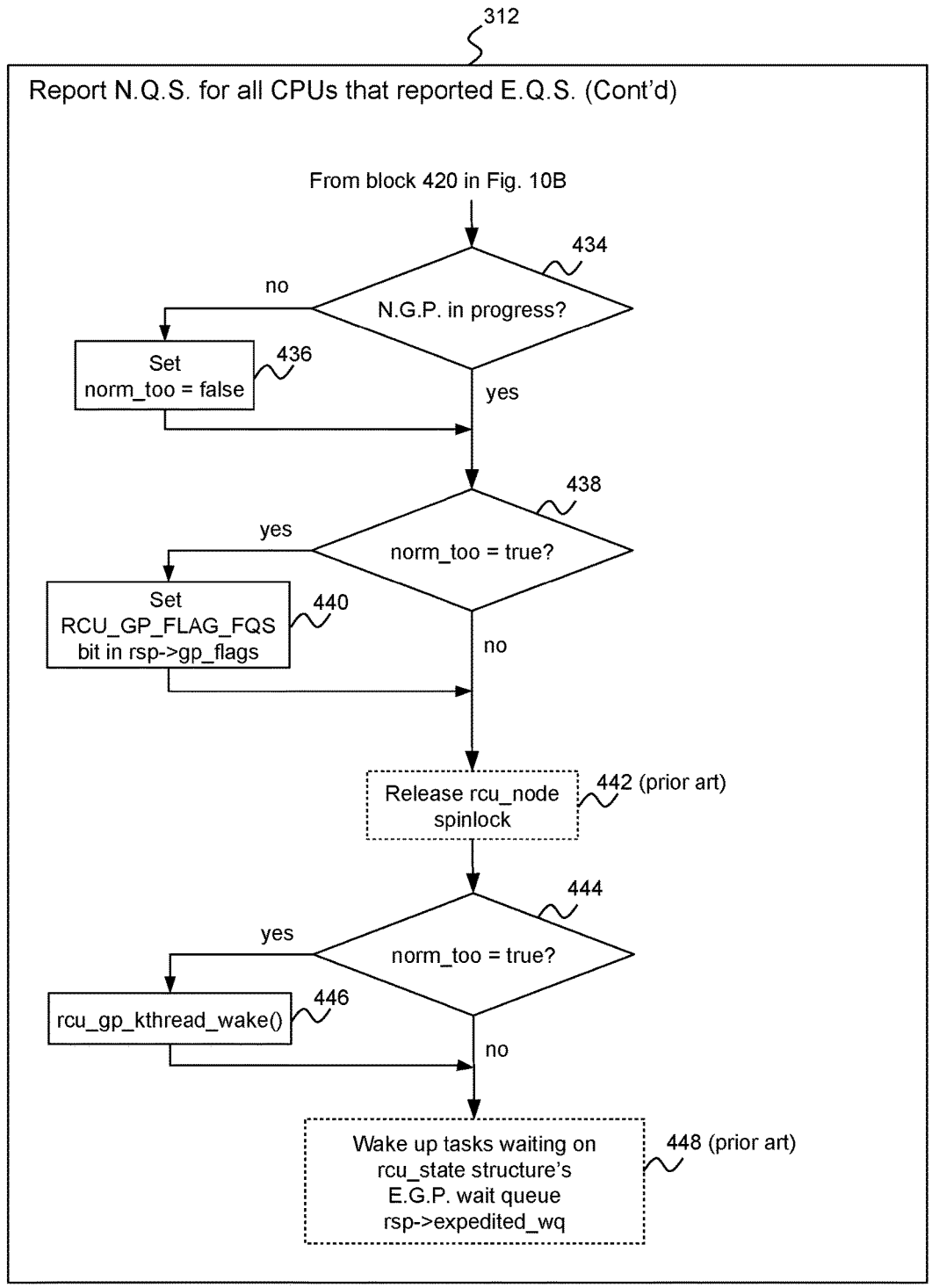

FIGS. 7, 8, 9 and 10A-10CB collectively represent example operations that may be performed by the expedited RCU grace period processing component 38 to short-circuit operations performed by the normal RCU grace period processing component 36. In the following discussion, it should be understood that the operations of FIGS. 7, 8 and 9 represent prior art that is conventionally found in RCU implementations used in the existing versions of the Linux® kernel, namely, in the Linux version 4.4 synchronize_sched_expedited( ) function (FIG. 7), the Linux version 4.4 sync_rcu_exp_select_cpus( ) function (FIG. 8), and the Linux version 4.4 rcu_report_exp_cpu_mult( ) function (FIG. 9). FIGS. 10A-10C represent a modified version of an existing RCU function used in version 4.4 of the Linux® kernel. This function is named _rcu_report_exp_rnp( ). As will be described in more detail below, the modified _rcu_report_exp_rnp( ) function reports normal quiescent states for offline, idle and RCU read-side critical section CPUs at the same time that expedited quiescent states are reported for the same CPUs, provided that the current expedited RCU grace period began after the current normal RCU grace period. It should be noted that this technique represents only one possible embodiment of the present disclosure, and that other approaches may be used in alternative embodiments.

Turning now to FIG. 7, a high-level description is shown of the Linux® version 4.4 RCU function named synchronize_sched_expedited( ). Block 102 of FIG. 7 takes a snapshot s of the expedited RCU grace period sequence counter 60 and block 104 attempts to acquire the root rcu_node structure's rnp→exp_funnel_mutex. The rnp→exp_funnel_mutex function takes the sequence counter snapshot s as a parameter and will fail if it is determined that a concurrent expedited RCU grace period has already performed the required expedited RCU grace period processing. In that case, block 106 of FIG. 7 returns to the caller. Otherwise, block 108 increments the expedited RCU grace period sequence counter 60 to start a new expedited RCU grace period. Subsequently, in block 114, the expedited RCU grace period sequence counter 60 will again be advanced at the end of the current expedited RCU grace period.

The expedited RCU grace period sequence counter 60 in some ways resembles a sequence lock in that the counter is incremented at the beginning and at the end of a given expedited RCU grace-period computation. If the expedited RCU grace period sequence counter 60 has an odd value, an expedited RCU grace-period computation is in progress. If the expedited RCU grace period sequence counter 60 has an even value, the expedited RCU grace period processing component 38 either is idle or is transitioning between a pair of consecutive expedited RCU grace-period computations. If the expedited RCU grace period sequence counter 60 has a value s at a given time, then once the sequence counter reaches the value $((s+3) \mathbin{\&} {\sim}0x1)$, a full expedited RCU grace period computation is guaranteed to have elapsed. It will be appreciated that the foregoing expression will produce a final value of s+2 whenever the s+3 sum is an odd number, and will produce a final value of s+3 whenever the s+3 sum is an even number. Readers 21 that begin their RCU read-side critical sections while s is an odd value (i.e., an expedited RCU grace period is underway) will be protected by having their data preserved until at least s+3, which represents the end of the next expedited RCU grace period following the current one. Readers 21 that began their RCU read-side critical sections while s is an even value (i.e., an expedited RCU grace period is not underway) will be protected by having their data preserved until at least the end of the next expedited RCU grace period to begin. This will be when the sequence counter reaches s+2.

Any given expedited RCU grace period request may take a snapshot of the expedited RCU grace period sequence counter 60, and at various times compare the expression above to the current value of the sequence counter to see if its current value is equal to or greater than the expression. In existing versions of the Linux® kernel, the snapshotting of the expedited RCU grace period sequence counter and the computation of the expression is carried out by the rcu_exp_gp_seq_snap( ) function, and the comparison is carried out by the rcu_exp_gp_seq_done( ) function. If the expedited RCU grace period sequence counter has advanced to or beyond the value specified by the expression, a concurrent expedited RCU grace-period computation has satisfied the current request. In FIG. 7, this check is performed by block 104 while traversing the tree of rcu_node structures 54 (from leaf to root) in an attempt to acquire the root rnp→exp_funnel_mutex. It should be understood that the sequence counter snapshot s obtained in block 10$_2$ of FIG. 7 may be the actual value of the expedited RCU grace period sequence counter 60 when the snapshot is taken, or alternatively, may be a value derived from the current sequence counter value, such as by invoking the rcu_exp_gp_seq_snap( ) function to compute $(s+3) \mathbin{\&} ({\sim}0x1)$.

In block 110 of FIG. 7, CPUs for which the current expedited RCU grace period needs to wait are selected. Further details of block 110 are described below in connection with FIG. 8. Block 112 of FIG. 7 waits for the CPUs selected in block 110 to report an expedited quiescent state. As previously noted, block 114 advances the expedited RCU grace period counter 60 to signify the end the current expedited RCU grace period. Block 116 then releases the root rnp→exp_funnel_mutex.

Turning now to FIG. 8, example operations are shown that may be performed by block 110 of FIG. 7 to select CPUs for which the current expedited RCU grace period needs to wait. FIG. 8 represents a high-level description of the Linux® version 4.4 RCU function named sync_rcu_exp_select_cpus( ). Block 202 of FIG. 8 initiates a loop that processes each leaf rcu_node structure 54 of the tree of rcu_node structures shown in FIGS. 5 and 6. Each pass through this loop performs blocks 204-214 for one of the leaf rcu_node structures 54. Block 204 acquires a spinlock maintained by the leaf rcu_node structure 54. Block 204 invokes a function named raw_spin_lock_irqsave_rcu_node( ) that also disables interrupts.

Block 206 identifies and notes each of the leaf rcu_node structure's CPUs that need an expedited quiescent state and are either offline or idle. These CPUs are identified by checking their respective rcu_dynticks→dynticks counters for an even value. For each such CPU, its offline/idle status is noted by a clearing a corresponding bit in a bitmask named mask_ofl_ipi (not shown) that identifies all online/non-idle CPUs associated with the leaf rcu_node structure 54 that are to receive IPIs. The mask_ofl_ipi bitmask corresponds to the leaf rcu_node structure's rnp→expmask bitmask (of CPUs that need an expedited quiescent state) but with the bits for all offline/idle CPUs being cleared.

Block 208 checks the leaf rcu_node structure's rnp→blk_tasks list to determine if there are any blocked reader tasks waiting on the present expedited RCU grace period. If so, this fact is noted by setting a pointer named rnp→exp_tasks (not shown) in the leaf rcu_node structure 54. This pointer references the first such blocked task. Block 210 releases the spinlock acquired in block 204. Block 204 invokes a function named raw_spin_unlock_irqrestore_rcu_node ( ) that also restores interrupts. Block 212 IPIs all of the leaf rcu_node structure's CPUs that are online and require an expedited quiescent state, and reports expedited quiescent states for these CPUs.

Block 214 reports an expedited quiescent state for all of the offline/idle CPUs identified and noted in block 206. Block 214 also reports the exit from an RCU read-side critical section of the last blocked reader identified and noted in block 208. Further details of block 214 will now be described in connection with FIG. 9.

Turning now to FIG. 9, example operations are shown that may be performed by block 214 of FIG. 8 to report expedited quiescent states for offline/idle CPUs and to report the exit from an RCU read-side critical section of the last blocked reader identified and noted in block 208 of FIG. 8. FIG. 9 represents a high-level of the Linux® version 4.4 RCU function named rcu_report_exp_cpu_mult( ). Block 302 of FIG. 9 checks whether the current leaf rcu_node structure 54 has any offline/idle CPUs. If not, processing is complete. If there are any offline/idle CPUs, block 304 acquires the leaf rcu_node structure's spinlock, i.e., via raw_spin_lock_irqsave_rcu_node( ). Block 306 checks whether the offline/idle CPUs need to report an expedited quiescent state. If not, block 308 releases the rcu_node structure's spinlock, i.e., via raw_spin_unlock_irqrestor_rcu_node( ), and returns. Otherwise, block 310 reports an expedited quiescent state for all of the offline/idle CPUs, i.e., by clearing each CPU's bit in the leaf rcu_node structure's rnp→expmask bitmask.

Block 312 reports the exit from an RCU read-side critical section of the last reader 21 that queued itself on the leaf rcu_node structure's rnp→blk_tasks list and was referenced by the rnp→exptasks pointer in block 208 of FIG. 8. This event is reported to either the rcu_node structure 54 on which the reader 21 is queued or to one of that rcu_node structure's ancestors, recursively up the tree of rcu_node structures 54.

Turning now to FIGS. 10A-10C, example operations are shown that may be performed by block 312 of FIG. 9. FIGS. 10A-10C represent a high-level description of a modified version of the Linux® version 4.4 RCU function named_rcu_report_exp_rnp( ). The modified version of _rcu_report_exp_rnp_( ) is a hybrid function that performs the reporting operation of block 312 of FIG. 9 and additionally implements the short-circuiting functionality of the present disclosure by reporting (if appropriate) a normal quiescent state for all CPUs associated with the same rcu_node structure 54 for which an expedited quiescent state is being reported. In FIGS. 10A-10C, operations that are provided by the conventional version of _rcu_report_exp_rnp( ) are shown in dashed-line representation and labeled as prior art. Operations that are new to the hybrid version of _rcu_report_exp_rnp( ) are shown in solid-line representation.

Turning now to FIG. 10A, block 402 snapshots the current normal grace period number rnp→gpnum for the current leaf rcu_node structure 54. For purposes of the present discussion, this grace period number snapshot may be named gps. Block 404 sets a flag indicating whether a normal RCU grace period is in progress whose start time (rsp→gpstart) is before the start time (rsp→gp_exp_start) of the current expedited RCU grace period. For purposes of the present disclosure, this normal grace period-indicating flag may be named norm_too. As will be described in more detail below, the gps grace period snapshot and the norm_too flag are used to condition the normal RCU grace period short-circuiting on (1) the normal grace period being already in progress when the expedited RCU grace period starts, and (2) the normal RCU grace period not ending before the expedited RCU grace period ends. This condition will be checked each time the expedited RCU grace period processing component 38 reports an expedited quiescent state on behalf of a CPU.

Block 406 of FIG. 10A initiates a loop that walks the tree of rcu_node structures 54. These data structures are used by both the normal RCU grace period processing component 36 and the expedited RCU grace period processing component 38 to report their respective normal and expedited quiescent states. The traversal of the rcu_node structure tree begins at the current leaf rcu_node structure 54, and propagates upwardly toward the root rcu_node structure 54. Each pass through this loop performs blocks 406-432 for every non-root rcu_node structure 54 on the traversal pathway. If the traversal reaches the root rcu_node structure 54, the final pass through the loop performs blocks 406-420 and 434-448 relative to the root rcu_node structure.

Block 408 checks whether the current rcu_node structure 54 still has expedited RCU grace period work to do, such that an expedited quiescent state cannot yet be reported. By way of example, this condition will exist for a non-leaf rcu_node 54 whose lower-level rcu_node structures have not all reported an expedited quiescent state. If block 408 produces a "yes" result, block 410 releases the rcu_node structure's spinlock (i.e., via raw_spin_unlock_irqrestore_rcu_node( )) and returns to the caller. Otherwise, block 412 compares the normal grace period snapshot (gps) taken in block 402 with the rcu_node structure's current rnp→gpnum value. If they are different (because the previous normal grace period completed and the rcu_node structure 54 has noted a new normal grace period), the norm_too flag is cleared to false in block 414. This means that the current expedited RCU grace period cannot assist the new normal RCU grace period.

Block 416 is reached following block 414 or if the test in block 412 indicates that the rcu_node structure's current rnp→gpnum value remains equal to the gps snapshot taken in block 402. Block 416 checks whether the norm_too flag is set to true. If it is, a normal quiescent state is reported for this rcu_node structure 54 by clearing its normal quiescent state mask rnp→qsmask.

Turning now to FIG. 10B, block 420 is reached following block 418 or if the test in block 416 indicates that the norm_too flag is not set. Block 420 checks whether the root rcu_node structure 54 has been reached. If not, block 422 releases the current rcu_node structure's spinlock (i.e., via raw_spin_unlock_irqrestore_rcu_node ( )), acquires a pointer to the parent rcu_node structure 54, and acquires the parent rcu_node structure's spinlock (i.e., via raw_spin_lock_irqsave_rcu_node( )). Block 424 registers an expedited quiescent state for the child rcu_node structure 54 by clearing the child's bit in the parent rcu_node structure's rnp→expmask field. Block 426 checks whether the grace period number rnp→gpnum for the current rcu_node structure 54 is not equal to the normal grace period snapshot (gps) determined in block 402 of FIG. 10A. If so, the norm_too flag is cleared to false in block 428. Following block 428, or if block 426 determines that gps and rnp→gpnum are equal, block 430 checks whether the norm_too flag is set to true. If it is, block 432 registers a normal quiescent state for the child rcu_node structure 54 by clearing the child's bit in the parent rcu_node structure's rnp→gpmask field. Following block 432, or if block 430 determines that the norm_too flag is not set to true, processing returns to block 406 of FIG. 10A for the next iteration of the rcu_node structure traversal.

Turning now to FIG. 10C, block 434 is reached if it was determined in block 420 that the root rcu_node structure 54 has been reached. Block 434 checks whether a normal RCU grace period is in progress. If not, block 436 clears the norm_too flag to false. Block 438 is reached following block 436 or if block 434 determines that a normal RCU grace period is in progress. Block 438 checks whether the norm_too flag is set to true. If it is, block 440 prepares for waking a normal RCU grace period kthread by setting an RCU_GP_FLAG_FQS bit the rsp→gp_flags field of the rcu_state structure 52. Setting this bit indicates to the grace period kthread that normal quiescent state forcing is needed.

Following block 440, or if block 438 finds the norm_too flag is not set, block 442 releases the rcu_node structure's spinlock (i.e., via raw_spin_unlock_irqrestore_rcu_node( )). Block 444 again checks whether the norm_too flag is set, and if it is, block 446 wakes a normal RCU grace period kthread, e.g., by using the RCU function named rcu_gp_kthread_wake( ). This will cause the grace period kthread to end the current normal RCU grace period, perform various post-grace period cleanup operations, and initialize a new grace period if one is needed.

Following block 446, or if block 444 finds the norm_too flag is not set, block 448 awakens any tasks that are waiting for the current expedited RCU grace period to end. Such tasks will have previously queued themselves on the rcu_state structure's rsp→expedited_wq wait queue. This completes the processing performed by the hybrid _rcu_report_exp_rnp( ) function of FIGS. 10A-10C.

The foregoing operations, which are performed by the expedited RCU grace period processing component 38, will help short-circuit the computations performed by the normal RCU grace period processing component 36. Normal quiescent states will be noted at the same time that expedited quiescent states are noted in situations where a normal RCU grace period can be satisfied by an expedited RCU grace period, thereby avoiding unnecessary normal RCU grace processing.

In existing RCU implementations used in the Linux® kernel, there are three phases of normal RCU grace period processing, as follows:

1. Grace-period initialization, implemented by the rcu_gp_init( ) function in current versions of the Linux® kernel.
2. Some number of force-quiescent-state passes, implemented by the rcu_gp_fqs( ) function in current versions of the Linux® kernel and including, among other things, checking for idle CPUs and reporting of quiescent states on behalf of these CPUs by clearing bits in the rcu_node structure rnp→qsmask bitmasks.
3. Grace-period cleanup, implemented by the rcu_gp_cleanup( ) function in current versions of the Linux® kernel.

In an embodiment of the present disclosure, the normal RCU grace period processing component 36 implements these three phases. Advantageously, the expedited RCU grace period processing of FIGS. 10A-10C that reports normal quiescent states by clearing bits in the rcu_node structure rnp→qsmask bitmasks will short-circuit the computations performed by the force-quiescent state passes of the normal RCU grace period processing component 36. Moreover, block 448 of the expedited RCU grace period processing of FIGS. 10A-10C invokes the normal RCU grace period cleanup phase by awakening the normal RCU grace period kthread if it is appropriate to do so.

This is not without consequence, however. Segmentation faults will occur if the normal grace period kthread has not yet been created. The wakeups should therefore be conditioned on the existence of this thread. Reduced RCU grace-period latency may also increase overhead per unit time. On a system with a high rate of expedited RCU grace periods, the overhead of normal RCU grace periods could be increased by orders of magnitude. Wakeups may therefore be spaced sufficiently to avoid excessive overhead. One way of doing this is to refrain from waking up the normal RCU grace period kthread more frequently than a predetermined time interval. For example, wakeups could be throttled by restricting them to once per "n" scheduling-clock-interrupt periods (e.g., ten jiffies in the Linux® kernel) or no more frequently than every "m" RCU grace periods (e.g., every four RCU grace periods) (normal or expedited). The numbers ten and four are mentioned by way of example only, and may be changed as required for a given installation or workload.

In an implementation wherein wakeup throttling is based on grace periods, the expedited RCU grace period processing component 38 could track grace periods using the leaf rcu_node structure 54. For example, the current normal RCU grace period number maintained in the leaf rcu_node structure's rnp→gpnum field could be recorded, as by storing it in a new rcu_node structure field, which might be named rnp-gpnum_exphelp (not shown). The normal grace period kernel thread could then propagate that information to the other leaf rcu_node structures 54. Then the expedited RCU grace period processing component 38 could check rnp→gpnum_exphelp and refrain from issuing a wakeup to the normal grace period kthread if an insufficient number of normal RCU grace periods have elapsed, but otherwise issue the wakeup.

Accordingly, a technique for short-circuiting normal read-copy update (RCU) grace period computations in the presence of expedited RCU grace periods has been disclosed. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-10.

With respect to a computer program product, digitally encoded program instructions may be stored on one or more non-transitory computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown)

that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawing figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for short-circuiting normal read-copy update (RCU) grace period computations in the presence of expedited RCU grace periods, said method comprising:
periodically performing normal RCU grace period processing that reports normal quiescent states on behalf of CPUs in a set of CPUs until a normal quiescent state has been reported on behalf of all of said CPUs in said set of CPUs, thereby allowing a normal RCU grace period to end;
periodically performing expedited RCU grace period processing that reports expedited quiescent states on behalf of CPUs in said set of CPUs until an expedited quiescent state has been reported on behalf of all of said CPUs in said set of CPUs, thereby allowing an expedited RCU grace period to end;
said expedited grace period being of shorter duration than said normal grace period;
responsive to a condition indicating that said normal RCU grace period processing can be short-circuited by said expedited RCU grace period processing, using said expedited RCU grace period processing to report both expedited quiescent states and normal quiescent states on behalf of the same CPUs in said set of CPUs.

2. The method of claim 1, wherein said condition comprises said normal grace period being already in progress when said expedited RCU grace period starts.

3. The method of claim 2, wherein said condition further comprises said normal grace period not ending before an end of said expedited RCU grace period.

4. The method of claim 3, wherein said condition of said normal grace period being already in progress and said condition of said normal grace period not ending before an end of said expedited RCU grace period are checked each time said expedited RCU grace period processing reports an expedited quiescent state on behalf of one of said CPUs in said set of CPUs.

5. The method of claim 1, wherein a common data structure shared between said expedited RCU grace period processing and said normal RCU grace period processing is used by said expedited RCU grace period processing to report said expedited quiescent states and by said normal RCU grace period processing to report said normal quiescent states.

6. The method of claim 1, wherein expedited RCU grace period processing invokes a wake-up of a normal grace period processing thread at the end of said expedited RCU grace period.

7. The method of claim 6, wherein said wake-up is throttled by conditioning it on a predetermined time interval having elapsed since a previous invocation of said wake-up or on a passage of a predetermined number of normal or expedited RCU grace periods.

8. A system, comprising:
a plurality of CPUs;
a memory coupled to said CPUs, said memory including a computer readable storage medium tangibly embodying at least one program of instructions executable by said CPUs to perform operations for short-circuiting normal read-copy update (RCU) grace period computations in the presence of expedited RCU grace periods, said operations comprising:
periodically performing normal RCU grace period processing that reports normal quiescent states on behalf of CPUs in a set of CPUs until a normal quiescent state has been reported on behalf of all of said CPUs in said set of CPUs, thereby allowing a normal RCU grace period to end;
periodically performing expedited RCU grace period processing that reports expedited quiescent states on behalf of CPUs in said set of CPUs until an expedited quiescent state has been reported on behalf of all of said CPUs in said set of CPUs, thereby allowing an expedited RCU grace period to end;
said expedited grace period being of shorter duration than said normal grace period;
responsive to a condition indicating that said normal RCU grace period processing can be short-circuited by said expedited RCU grace period processing, using said expedited RCU grace period processing to report both expedited quiescent states and normal quiescent states on behalf of the same CPUs in said set of CPUs.

9. The system of claim 8, wherein said condition comprises said normal grace period being already in progress when said expedited RCU grace period starts.

10. The system of claim 9, wherein said condition further comprises said normal grace period not ending before an end of said expedited RCU grace period.

11. The system of claim 10, wherein said condition of said normal grace period being already in progress and said condition of said normal grace period not ending before an end of said expedited RCU grace period are checked each time said expedited RCU grace period processing reports an expedited quiescent state on behalf of one of said CPUs in said set of CPUs.

12. The system of claim 8, wherein a common data structure shared between said expedited RCU grace period processing and said normal RCU grace period processing is used by said expedited RCU grace period processing to report said expedited quiescent states and by said normal RCU grace period processing to report said normal quiescent states.

13. The system of claim 8, wherein expedited RCU grace period processing invokes a wake-up of a normal grace period processing thread at the end of said expedited RCU grace period.

14. The system of claim 13, wherein said wake-up is throttled by conditioning it on a predetermined time interval having elapsed since a previous invocation of said wake-up or on a passage of a predetermined number of normal or expedited RCU grace periods.

15. A computer program product, comprising:
one or more non-transitory computer readable data storage media;
program instructions stored on said one or more computer readable data storage media for programming a data processing platform having a plurality of CPUs to perform operations for short-circuiting normal read-copy update (RCU) grace period computations in the presence of expedited RCU grace periods, said operations comprising:
periodically performing normal RCU grace period processing that reports normal quiescent states on behalf of CPUs in a set of CPUs until a normal quiescent state has been reported on behalf of all of said CPUs in said set of CPUs, thereby allowing a normal RCU grace period to end;
periodically performing expedited RCU grace period processing that reports expedited quiescent states on behalf of CPUs in said set of CPUs until an expedited quiescent state has been reported on behalf of all of said CPUs in said set of CPUs, thereby allowing an expedited RCU grace period to end;

said expedited grace period being of shorter duration than said normal grace period;

responsive to a condition indicating that said normal RCU grace period processing can be short-circuited by said expedited RCU grace period processing, using said expedited RCU grace period processing to report both expedited quiescent states and normal quiescent states on behalf of the same CPUs in said set of CPUs.

16. The computer program product of claim 15, wherein said condition comprises said normal grace period being already in progress when said expedited RCU grace period starts.

17. The computer program product of claim 16, wherein said condition further comprises said normal grace period not ending before an end of said expedited RCU grace period.

18. The computer program product of claim 17, wherein said condition of said normal grace period being already in progress and said condition of said normal grace period not ending before an end of said expedited RCU grace period are checked each time said expedited RCU grace period processing reports an expedited quiescent state on behalf of one of said CPUs in said set of CPUs.

19. The computer program product of claim 15, wherein a common data structure shared between said expedited RCU grace period processing and said normal RCU grace period processing is used by said expedited RCU grace period processing to report said expedited quiescent states and by said normal RCU grace period processing to report said normal quiescent states.

20. The computer program product of claim 15, wherein expedited RCU grace period processing invokes a wake-up of a normal grace period processing thread at the end of said expedited RCU grace period.

* * * * *